United States Patent [19]

Kruse

[11] 4,012,086

[45] Mar. 15, 1977

[54] SHAFT MOUNTED BEARING FOR WITHDRAWAL OVER BURRS ON SHAFT

[75] Inventor: Claus A. Kruse, Valparaiso, Ind.

[73] Assignee: McGill Manufacturing Company, Inc., Valparaiso, Ind.

[22] Filed: June 16, 1975

[21] Appl. No.: 586,899

[52] U.S. Cl. .............................. 308/236; 403/362
[51] Int. Cl.² ...................... F16C 33/30; B25G 3/02
[58] Field of Search .......... 308/236, 189, 193, 195, 308/72, 188; 403/362

[56] References Cited

UNITED STATES PATENTS

| 2,102,375 | 12/1937 | Morton | 403/362 |
|---|---|---|---|
| 2,136,819 | 11/1938 | Large | 403/362 |
| 2,553,337 | 5/1951 | Shafer | 403/362 |
| 3,797,901 | 3/1974 | Smith | 308/236 |

FOREIGN PATENTS OR APPLICATIONS

| 246,262 | 4/1963 | Australia | 403/362 |

Primary Examiner—Joseph F. Peters, Jr.
Assistant Examiner—Richard A. Bertsch

[57] ABSTRACT

The inner race ring of a bearing is locked to a shaft mounted in the bearing by means of a plurality of set screws spaced circumferentially in an axial end portion of such race ring and each impinging on the shaft to raise a burr on the shaft at the nose of the set screw. So that any burr on the shaft will not interfere with the separation of the shaft and the bearing, a 360° circumferentially extending relief bore is provided on the inside of the inner race ring where the set screws are threadably maintained which has dimensions such that any burr on the shaft is cleared by such relief bore when the shaft and bearing are separated for repair or replacement of the bearing or the shaft.

4 Claims, 5 Drawing Figures

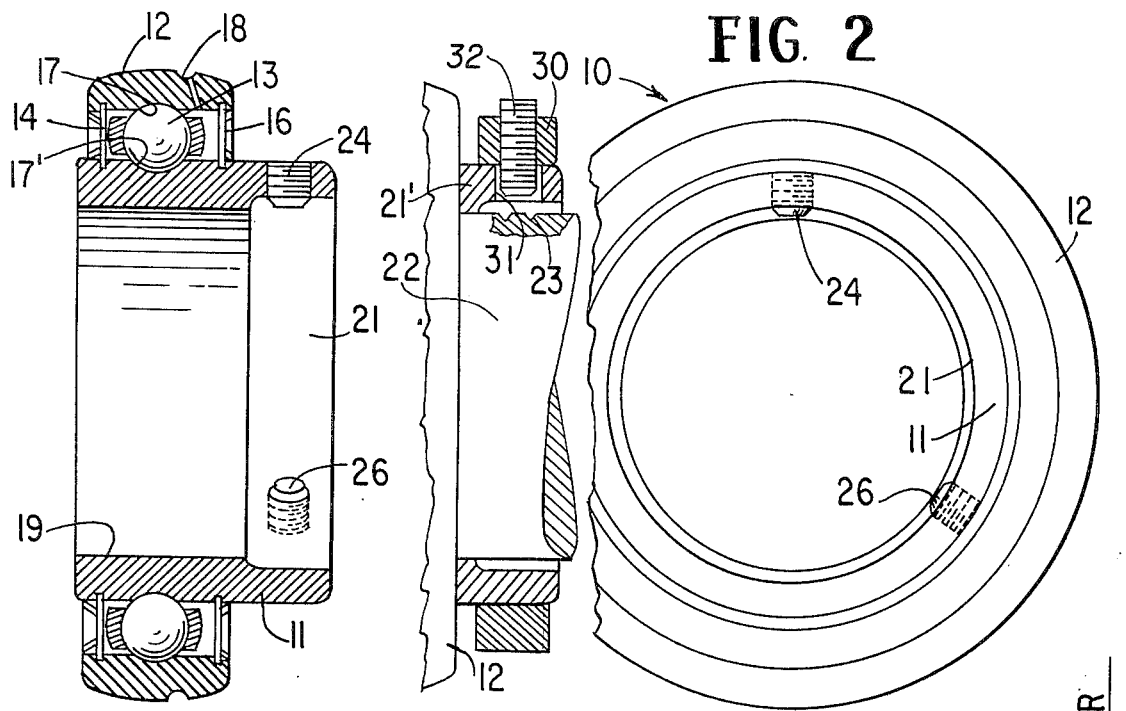
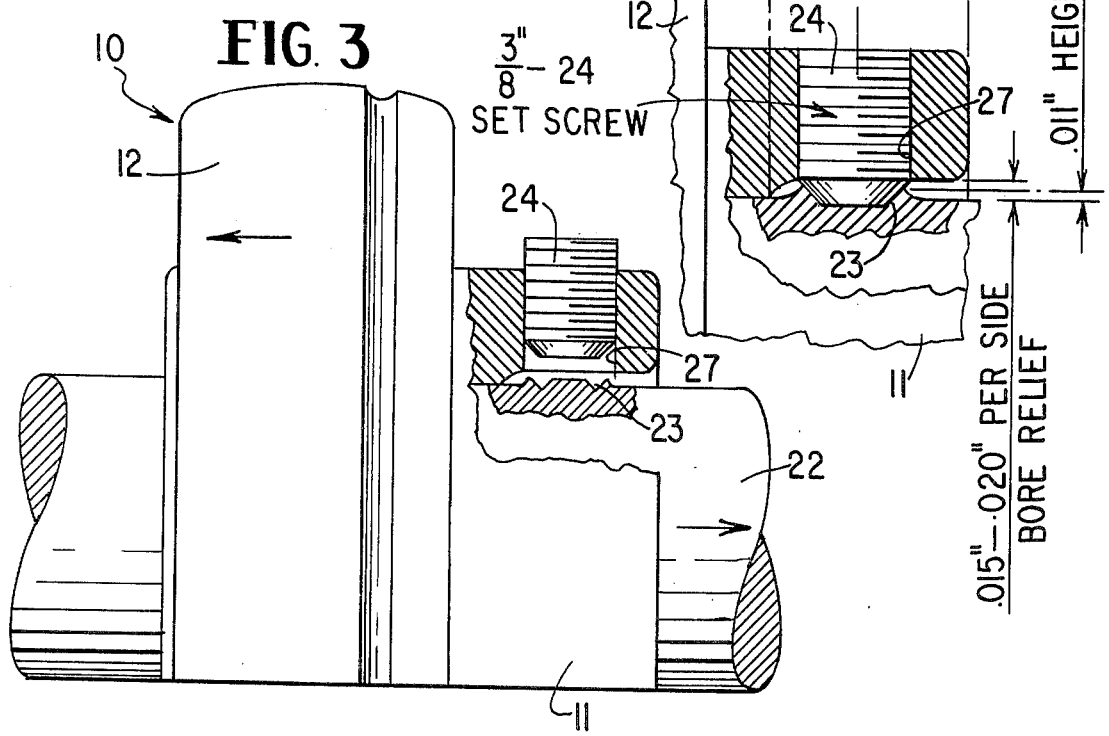

SHAFT MOUNTED BEARING FOR WITHDRAWAL OVER BURRS ON SHAFT

BACKGROUND OF THE INVENTION

This invention relates to bearings used to mount shafts for rotation in the bearing, and particularly relates to a pillow block bearing wherein the inner race ring of the bearing is locked to the shaft by circumferentially spaced set screws in the race ring which are threadably tightened on to the shaft.

Shafts mounted in pillow block bearings are conventionally of relatively soft steel. In fact, most shafting for pillow block bearings is of necessity rather long, and is most readily available in the soft form. If the shaft was hardened, it would be expensive and there would be a disadvantage to it for much of the holding power of the set screw locking depends upon a hard set screw deforming the shaft as the set screw is tightened to locking position on the shaft. When the hard steel set screw is tightened onto the shaft, the set screw deforms or raises burrs as the end of each set screw digs into the shaft. Although the burrs in one typical bearing size are generally in the order of 0.011 inch high, this is still a protuberance on the shaft and is in frictional contact with the bore of the inner race ring, for the latter normally fits rather closely to the surface of the shaft.

Other locking means than set screws have been employed for locking a pillow block bearing on a shaft but these are more expensive than multiple set screw locking, and the latter is the preferred structure for bearings particularly of the pillow block type.

Bearings, and sometimes shafts, wear in use and have to be replaced. The burrs are raised directly under the respective set screws and hence within the bore of the inner race ring, and they make it very difficult to slide the shaft and inner race ring relative to one another to separate them for replacing the bearing or shaft. Normally it is the bearing which has to be replaced, but for those installations where the shaft must be replaced the advantages of the present invention apply.

Inasmuch as set screw locking has been the most conventional means for locking a pillow block bearing on a shaft for as long as pillow block bearings have been used, the matter of burrs on the shaft is a long standing problem in the bearing art when bearing and shaft must be separated.

SUMMARY OF THE INVENTION

It is an object of this invention to continue to utilize set screw locking for the inner race ring of a ball or roller bearing on a shaft as has been the practice for many, many years. Furthermore, inasmuch as the shaft mounted in such a bearing is dead-soft and burrs will be formed on the shaft under the race ring when hardened set screws are tightened thereon, the object of my invention is to provide a bearing using set screw locking but with the bearing of a structure which will make it very easy to remove the bearing from the shaft and vice versa.

A further object of the invention is to retain all of the advantages of a positive set screw locking of an antifriction bearing on a shaft which raises burrs on the shaft where each screw impinges the surface, and yet provided an inner race ring for the structure such that the burrs on the shaft will not in any way interfere with the easy separation of shaft and bearing for replacement of one or the other.

The feature of my invention is the provision of a relief bore axially in the inner bore of a one-piece inner race ring with such a diameter as to clear the burrs which are formed on the shaft when locking the bearing on the shaft by means of hardened set screws.

In one embodiment of the invention a roller or ball bearing such as a pillow block bearing with an inner race ring and an outer race ring, has set screws extending radially inwardly through one axial end portion of the inner race ring. A raceway is provided on the outside of the other axial end portion of the one-piece inner race ring for supporting rollers or balls thereon, and the latter in turn support the outer race ring. The shaft within the inner race ring bore is locked against circumferential or axial movement relative to such inner race ring and this combination of shaft and inner race ring rotates within the outer race ring. The bearing is secured to a ceiling in the shop, or is mounted on a piece of shop apparatus, or in some other conventional manner to so mount the rotatable shaft.

When burrs are formed in the shaft at the end of the hardened set screws from the tightening of the screws and it is desired to replace the bearing or the shaft on which the bearing is secured, the set screws are loosened in the inner race ring to in turn loosen the bearing on the shaft. The shaft may be pulled out of the inner race ring of the bearing in an axial direction away from said one axial end portion. The burrs on the shaft will clear the inner surface of the relief bore without any problems. Or, if it is desired to slide the bearing off the shaft, it is moved in a direction away from the burrs, and such relief bore readily clears the burrs for easy separation of the bearing and shaft.

The relief bore in the inner race ring can be readily machined by a separated predetermined cut of the machine tool after the bore of such race ring is machined, such as to add relatively no cost over the manufacturing cost of the conventional bearing with set screw locking but which does not have the present invention. At the same time the long conventional set screw structure for such locking can be maintained, burrs can be raised on the softer shaft by the impingement of the set screws when they firmly lock the bearing in position on the shaft, and yet all of the time and effort previously consumed in taking the bearing from the shaft is eliminated. The relief bore of the present invention accommodates such burrs and either the shaft or the inner race ring are pulled from the other in a direction such that the movement is away from the burred shaft portion.

DESCRIPTION OF THE DRAWINGS

FIG. 1 is an elevational view in cross-section which illustrates a pillow block bearing assembly with the inner race ring and locking set screws provided with a relief bore opening from the locking end of such race ring, and such relief bore has an inner diameter sufficient to clear any burr formed by the impingement of the set screws on the shaft on which the bearing is assembled;

FIG. 2 is an end view of the bearing of FIG. 1 looking into the right hand or axial end portion as viewed in FIG. 1;

FIG. 3 is a view shown as an enlargement relative to FIGS. 1 and 2 of a portion of the shaft on which the bearing is mounted with the lower portion of the assembled bearing cut off. The relief bore and a set screw are illustrated in the broken away right hand or axial end portion of the figure, with a set screw retracted to show the burr that it has raised on the shaft within such relief bore portion. Dimensions for a typical bearing installation are shown on the figure;

FIG. 4 is a detail of the broken-away portion of FIG. 3 with the set screw in locking position such as that when it forms a burr on the shaft; and FIG. 5 is a modification for the mount for the locking set screws wherein an annular collar with threaded bores is carried on the inner race ring, and elongated set screws extend through unthreaded axial bores in the race ring.

DETAILED DESCRIPTION

Referring to FIGS. 1 and 3 of the drawings, a pillow block bearing 10 is shown with an inner race ring 11, an outer race ring 12 and a ball bearing assembly 13 between the two. Seal members 14 and 16 are maintained in opposite axial ends of the space between the inner and outer race rings. The balls 13 are maintained in the raceway 17-17' formed in the inner and outer race ring, and a hole 18 is provided for lubricating the bearing.

The inner race ring 11 has two axial portions to its inner bore, the portion 19 having an inner diameter such as to fit on the shaft upon which it is to be mounted, and an axial inner ring portion 21 with an inner diameter greater than the inner diameter of the portion 19 and greater than the diameter of the shaft 22 upon which the bearing is to be mounted. This is a so-called relief bore 21 which from the illustrations in FIGS. 1 and 3 can be seen to provide the relief necessary to clear burrs 23 on the shaft 22 formed when the hardened locking set screws 24 and 26 are tightened onto the shaft 22 which is softer than the screws. Then, separation of the bearing and shaft can be accomplished without interference from burrs 23 which stand up higher than the wall of the main inner bore of the race ring.

As illustrated in FIG. 3, the shaft 22 upon which the bearing 10 is assembled is shown merely in a cut-away section, and a burr 23 is shown immediately below the set screw 24 which has been retracted in its threaded bore 27 from its locking position on the shaft 22.

The locking position for the set screw 24 at which the set screw cuts into tthe dead-soft shaft 22 to form the burr 23 is shown in FIG. 4 in a fragmentary portion corresponding to the broken-away portion of FIG. 3.

Formerly with a set screw locking structure for a bearing on a shaft, and particularly for a pillow block bearing installation on a shaft, when a burr such as 23 was raised on the shaft merely by the impingement of the set screw into the dead-soft shaft, it was very difficult to separate the shaft and bearing, whether the bearing was to be slid from the shaft, or the shaft pulled out of the bearing. In fact, substantial time and effort was required to accomplish the separation when the bearing was to be replaced. However, from the illustration in FIG. 3, with the screw 24 retracted, the shaft 22 can be removed from the bearing in the direction of the arrow on the shaft, or the bearing can be removed from the shaft in the direction of the arrow on the outer race ring 12.

With the present invention, in each instance, the relief bore 21 clears the burr 23 raised on the shaft and shown in FIGS. 3 and 4. Two set screws 24 and 26 are illustrated in FIGS. 1 and 2, but whatever the number of set screws employed, the relief bore has an inner diameter such as to clear each of the burrs formed on the shaft.

Representative dimensions are shown in FIG. 3 for a typical installation of a pillow block bearing on a shaft having a diameter of 2.4375", with the relief bore being 0.015–0.020 inches on each side. It has been found that a burr approximately 0.011 inch in height is normally raised by the set screw impingement on a standard dead-soft shaft. In this typical installation the relief length of that portion of the inner race ring is 19/32 inch, and the threaded bore or aperture 27 in FIG. 3 is centered 3/8 inch from the end face of such inner race ring 19. These dimensions are not limiting in any sense, but do provide a more definitive illustration of the use of the present invention, and FIGS. 3 and 4 show clearly how burrs formed on the shaft extend above the bore for the inner race ring. In the prior bearings the burrs acted on the inside edge of the threaded bore for the set screw, and were difficult to knock down. This made it difficult in the prior structures to remove the bearing from such shaft.

A modification is shown in FIG. 5 wherein a collar 30 is mounted on the axial inner race ring portion 21' and has a plurality of threaded bores or apertures therein. Each set screw 32, the same in number, or greater in number than screws 24 and 26 in FIGS. 1 and 2, are long enough to be threadably maintained in the collar 30, and extend through unthreaded bores 31 in the race ring portion 21' and impinge on the surface of the shaft 22. Each screw 32 will raise a burr 23 on the shaft in exactly the manner of the set screws 24 and 26 threadably maintained in the race ring as shown in FIG. 4. Separation of shaft and bearing is accomplished in exactly the same way as for the principal embodiment of the invention.

Accordingly, the invention provides an effective simple answer to a long standing problem with a bearing and shaft separation when burrs are formed on the shaft by the set screw locking means for the bearing.

I claim:

1. In the combination with a shaft, a bearing mounted on said shaft having outer and inner race members with a raceway therebetween and anti-friction bearing members in said raceway, said inner race member having an integral locking portion axially displaced from said raceway and with at least one radially extending threaded bore in said locking portion, a set screw threadably maintained in said threaded bore for radial threaded movement into said shaft at a point coextensive with said threaded bore to impinge upon and lock into said shaft and raise a burr thereon extending radially toward said bore and normally acting to impede separation of said shaft and said bearing when said set screw is retracted, the improvement comprising means in said inner race member for avoiding said burr impediment from preventing said separation of shaft and bearing, said means comprising a circumferential relief bore extending inside said locking portion over the entire 360° thereof and opening from the outer axial end of said locking portion, said relief bore having an axial width greater than the dimension of said threaded bore from said outer axial end of said locking portion and a radial height from said shaft greater than the height of any burr raised on the shaft by said set screw, whereby upon retraction of said set screw from a locking position on the shaft, said shaft and said bearing may be separated in an axial direction away from a burr on said shaft.

2. A bearing adapted to have a shaft mounted therein by relative axial movement of shaft and bearing, with the latter thereafter secured to the shaft by at least one set screw in the bearing, and said set screw adapted to be threadably tightened onto such a shaft and to raise a burr on said shaft at the end of the set screw as a result of said tightening, said bearing comprising a one-piece inner race ring including a shaft bore adapted to be mounted directly on a shaft and such race ring having a circumferential raceway on the outside of one axial portion and having an adjacent axial portion therewith which has at least one hole therein extending radially inwardly through said adjacent axial portion, a set screw in said hole which is maintained in position to be threadably tightened into such a shaft to raise a corresponding burr on such a shaft at a position substantially radially coextensive with said hole, the improvement in said adjacent axial portion comprising an axial relief bore on the inside thereof and a circumferential wall on said relief bore extending 360° within said adjacent axial portion, said relief bore having a diameter greater than the diameter of the shaft bore such as to space said circumferential wall from a shaft upon which the bearing is mounted a radial dimension greater than the height of any burr raised on the shaft by the tightening of said set screw thereon and said relief bore having an axial dimension greater than the dimension of any burr raised on a shaft from said open end of said bore with said radial and said axial dimensions of said relief bore being such that any burr on such shaft from said set screw tightening will not interfere with the separation of bearing and shaft in an axial direction away from such a burr.

3. In a bearing as defined in claim 2 having a plurality of holes extending radially inwardly and spaced circumferentially in said adjacent axial portion, said bearing having an annular collar surrounding and mounted on said adjacent axial portion, a plurality of threaded holes in said collar coextensive with said plurality of holes in said adjacent axial portion, and with each set screw threadably maintained in said collar holes and being long enough to extend through said adjacent axial portion holes and adapted to be tightened on a shaft and raise a burr thereon radially coextensive with a corresponding hole.

4. In a bearing as defined in claim 2 wherein each set screw is hardened and such shaft adapted to be mounted in said bearing is a dead-soft steel shaft.

* * * * *